United States Patent
Mei

(10) Patent No.: US 11,187,604 B2
(45) Date of Patent: Nov. 30, 2021

(54) DIFFERENTIAL PRESSURE SENSOR

(71) Applicant: EUROSWITCH S.R.L., Sale Marasino (IT)

(72) Inventor: Giovanni Mei, Castegnato (IT)

(73) Assignee: EUROSWITCH S.P.A., Sale Marasino (IT)

( * ) Notice: Subject to any disclaimer, the term of this patent is extended or adjusted under 35 U.S.C. 154(b) by 137 days.

(21) Appl. No.: 16/478,977

(22) PCT Filed: Feb. 12, 2018

(86) PCT No.: PCT/IB2018/050838
§ 371 (c)(1),
(2) Date: Jul. 18, 2019

(87) PCT Pub. No.: WO2018/150310
PCT Pub. Date: Aug. 23, 2018

(65) Prior Publication Data
US 2019/0353546 A1 Nov. 21, 2019

(30) Foreign Application Priority Data

Feb. 15, 2017 (IT) .......................... 102017000016673

(51) Int. Cl.
*G01L 13/02* (2006.01)
*G01L 9/00* (2006.01)
(Continued)

(52) U.S. Cl.
CPC ............ *G01L 13/02* (2013.01); *G01L 9/0089* (2013.01); *G01L 9/14* (2013.01); *G01L 19/08* (2013.01); *G01L 19/143* (2013.01)

(58) Field of Classification Search
CPC ......... G01L 13/02; G01L 9/0089; G01L 9/14; G01L 19/08; G01L 19/143; G01L 19/144
See application file for complete search history.

(56) References Cited

U.S. PATENT DOCUMENTS 4,525,874 A * 6/1985 Baues .................. H04B 10/807
398/168
5,702,592 A * 12/1997 Suri ..................... B01D 35/143
210/90

FOREIGN PATENT DOCUMENTS

DE 202006014410 U1 12/2006
DE 102013113438 A1 * 6/2015 ......... G02B 19/0009
(Continued)

OTHER PUBLICATIONS

Translation of DE-102013113438-A1 (Year: 2015).*
International Search Report and Written Opinion dated May 30, 2018 for counterpad PCT Application No. PCT/IB2018/050838.

*Primary Examiner* — Nathaniel T Woodward
(74) *Attorney, Agent, or Firm* — Shuttleworth & Ingersoll, PLC; Timothy Klima

(57) ABSTRACT

A differential pressure sensor includes a containment body including internally a wall creating first and second cavities, a piston slidingly housed in the first cavity and including a magnet mounted on a first axial end thereof, proximal to the wall and a magnetic sensor housed in the second cavity, near the wall for measuring the axial distance of the magnet from the wall and generating a signal representing such distance. The pressure sensor further includes a lighting element for emitting light radiation, a control circuit operatively interposed between the magnetic sensor and the lighting element and configured for varying the light radiation emitted by the lighting element as a function of a variation in the representative signal generated by the magnetic sensor. An interface element includes a radiant surface facing outwards from the body and an optical guide, extending between the lighting element and the radiant surface.

17 Claims, 5 Drawing Sheets

(51) Int. Cl.
  *G01L 9/14* (2006.01)
  *G01L 19/08* (2006.01)
  *G01L 19/14* (2006.01)

(56) References Cited

FOREIGN PATENT DOCUMENTS

DE 102013113438 A1 6/2015
EP 2796845 A1 10/2014

* cited by examiner

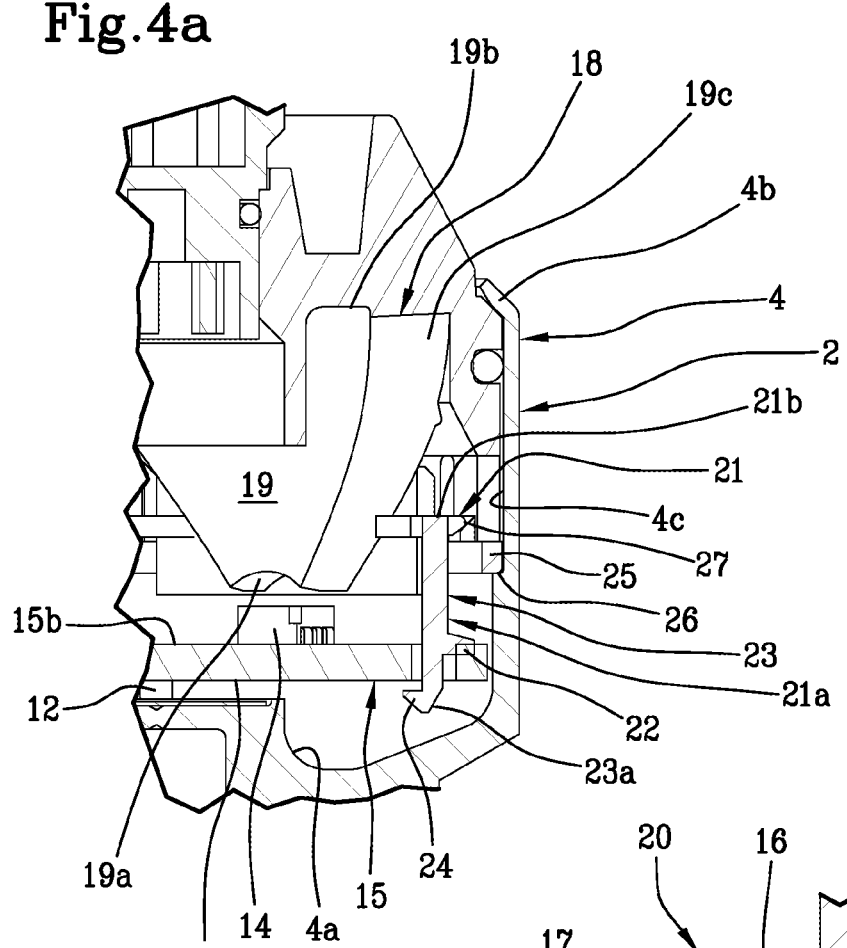
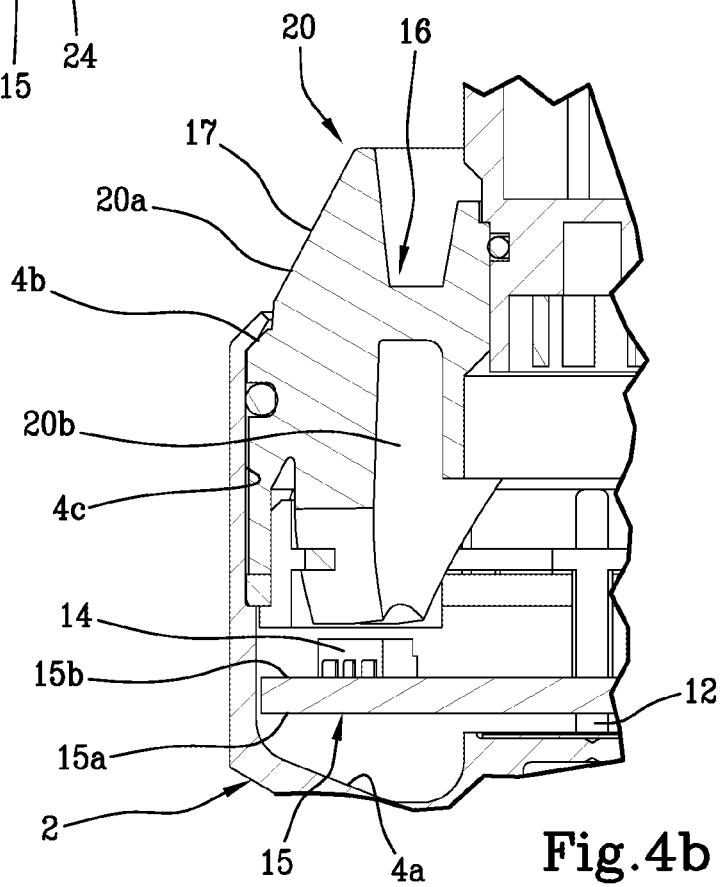

DIFFERENTIAL PRESSURE SENSOR

This application is the National Phase of International Application PCT/IB2018/050838 filed Feb. 12, 2018 which designated the U.S.

This application claims priority to Italian Patent Application No. 102017000016673 filed Feb. 15, 2017, which application is incorporated by reference herein.

The present invention relates to a differential pressure sensor.

Therefore, the present invention finds its main application in the field of sensors for controlling systems, pipes and tubes containing pressurized fluid.

In fact, differential pressure sensors known in the prior art are suitable for measuring, inside a pipe/circuit containing pressurized fluid, the difference in pressure between two different and opportune points, providing an analog or digital output signal representing such difference. By pressurized fluid, we mean indistinctly a liquid (e.g. oil), a gas or vapor.

Typically, such devices are used for measuring the difference in pressure, which is established between the section upstream and the section downstream of a determined element inside a hydraulic circuit, such as, for example, a filter, so as to be able to monitor the level of saturation/clogging thereof.

Differential pressure transmitters are differential pressure sensors suitable for measuring a plurality, typically a continuum, of values of the aforesaid difference in pressure in a working range. In this sense, they are different from the differential pressure sensors of the ON/OFF type (commonly called 'electric or electromechanical differential sensors'), capable of measuring only the attainment or not of a pressure difference threshold value.

A class of transmitters also exists, characterized by a complex structure and high industrial costs, which measures the value of the two pressures separately, which are then compared to supply the output signal representing their difference.

The typology of sensors referred to in the present invention, instead, measures the difference in pressure directly between the two sections of the pipe, supplying an output signal representing such value, which is typically proportionate thereto.

Sensors of such typology are generally provided with a mechanical semi-part and an electronic semi-part.

The mechanical semi-part is typically a piston fluctuating inside a cylinder and positioned so as to divide it into two hydraulically insulated chambers, each of which is placed in fluid connection (i.e. at the same pressure) with one of the two sections of pipe to be monitored.

The position of the piston inside the cylinder thus becomes dependent on the difference in pressure, which is to be measured.

In this regard, the piston is provided with a magnet at one of its axial ends, facing a bottom wall of the cylinder, so that the movement of the piston determines a variation of the distance of the magnet with respect to the bottom wall and consequently into a corresponding variation of the magnetic field, at the bottom wall itself.

For such reason, a magnetic sensor (generally a Hall effect sensor) is usually placed externally to the bottom wall of the cylinder, allowing the continuous measuring of the variation of the magnetic field, in other words, of the distance of the magnet from the bottom wall. A suitable electronic circuit translates the information produced by the magnetic sensor into a signal representing the difference in pressure, reconstructing the transductions carried out "mechanically and magnetically" in the device.

However, one of the problems regarding such devices, despite being indisputably high performing and efficient in terms of measuring the pressure differential, consists of communicating the "output" to operators.

In fact, the Applicant has observed how sensors of this type, not being used for "piloting", but for control, are frequently positioned along circuits or pipes located in areas, which are relatively inaccessible, or nevertheless, not immediately visible to operators.

For this reason, most of the operators are forced to access the sensor with considerable difficulty, in order to be able to evaluate the output signal thereof (colored notch or numerical screen).

Alternatively, it is necessary to connect the sensor to a processor capable of visualizing the output thereof on a screen placed in a convenient position for the operator.

Both of the situations described above involve important drawbacks in terms of intervention speed and system complexity, factors, which certainly cannot be considered secondary, especially in lines or circuits where numerous elements need to be kept under control.

In the light of the above, it is an object of the present invention to provide a differential pressure sensor capable of overcoming the drawbacks of the prior art described above.

In particular, it is an object of the present invention to provide a differential pressure sensor, which is capable of rendering the information returned by the sensor with as great a visual impact as possible.

More specifically, it is an object of the present invention to realize a differential pressure sensor capable of providing workers with a simple and immediate indication of the condition of the element being monitored, also from a distance.

Again, it is a further object of the present invention to provide a differential pressure sensor with the characteristics presented above, which is simple to construct and easy to assemble.

Said objects are achieved by means of a differential pressure sensor having the characteristics in one or more of the following claims and in particular, comprising a containment body extending along a main axis thereof and provided internally with a separation wall suitable for dividing it into a first and a second cavity arranged in succession along said main axis.

The pressure sensor further comprises a piston slidingly housed in the first cavity, so as to separate the latter into a first and a second chamber, wherein each chamber is in fluid connection with the outside of the containment body.

The piston preferably comprises a magnet mounted on a first axial end thereof proximal to the separation wall.

A magnetic sensor is housed in the second cavity near the separation wall; such sensor is configured for measuring the axial distance of the magnet from said separation wall and for generating a signal representing such measured distance.

Preferably, the magnetic sensor is based on the Hall effect.

According to one aspect of the present invention, the pressure sensor comprises at least one lighting element capable of emitting light radiation and a control circuit operatively interposed between said magnetic sensor and said lighting element.

The control circuit is preferably configured for varying the light radiation emitted by the lighting element as a function of a variation in the representative signal generated by said magnetic sensor.

Note that, preferably, the lighting element comprises one or more LEDs, more preferably one or more RGB LEDs controllable by the control circuit in the three colors green-yellow-orange-red.

Advantageously, in this way, on varying the pressure in the two chambers of the first cavity, the output signal of the sensor translates into a chromatic variation, preferably discontinuous, of the lighting element, making identification of the condition of the element being monitored (e.g. filter) easy and immediate for operators.

Preferably, the pressure sensor comprises at least one interface element provided with at least one radiant surface facing outwards from the containment body and at least one optical guide extending between said at least one lighting element and said at least one radiant surface, shaped to transfer the light radiation from the lighting element to the radiant surface.

In the present document, the expression "optical guide" is understood as defining an element (full or tubular) configured for guiding the light radiation emitted by the lighting element, preferably with a given directionality, carrying it towards the radiant surface.

Therefore, the optical guide can be an optical fiber, or a transparent means complying with the principles of geometrical optics.

Note that the radiant surface of the interface element has a greater extension (i.e. surface/area extension) with respect to a light emitting surface of the lighting element.

Therefore, the optical guide is configured not only for guiding, but also for diffusing the light radiation from the lighting element to the radiant surface.

Advantageously, in this way the differential pressure sensor allows easy visualization for operators, also from a distance, without the latter needing to approach or reach the sensor placed in proximity to the tubing.

Preferably, in order to simplify assembly and ensure the correct diffusion of the light, the optical guide and the radiant surface are made in a single piece.

Preferably, the lighting element is positioned inside the second cavity, while the radiant surface is facing externally thereto, more preferably at an end portion opposite the separation wall.

In this light, the optical guide extends preferably along the main axis between a first end, facing said at least one lighting element, and a second end, facing the radiant surface and is preferably integrated therein.

In this regard, note that preferably, the magnetic sensor, the control circuit (or printed circuit board) and the lighting element are axially (and radially) connected to one another.

Clearly, this significantly facilitates the assembly of the pressure sensor and the correct insertion of all of the elements into the second cavity.

Furthermore, the control circuit preferably has a planar development with two faces opposite each other, a first one facing the separation wall to which the magnetic sensor is anchored, and a second one, opposite the first, to which the lighting element is anchored.

Preferably, the interface element and the optical guide are integrated into a cap of the pressure sensor, which is anchored to the aforesaid end portion of the second cavity.

Advantageously, in this way, the assembly of the pressure sensor is simplified even further.

These and other characteristics, as well as the relative advantages will become even more apparent from the following description, which is given by way of example and therefore not limiting, of the preferred embodiment, which is thus not exclusive, of a differential pressure sensor realized according to the appended figures, wherein:

FIGS. 4a and 4b show two details in FIGS. 2 and 3;

Figure 1:
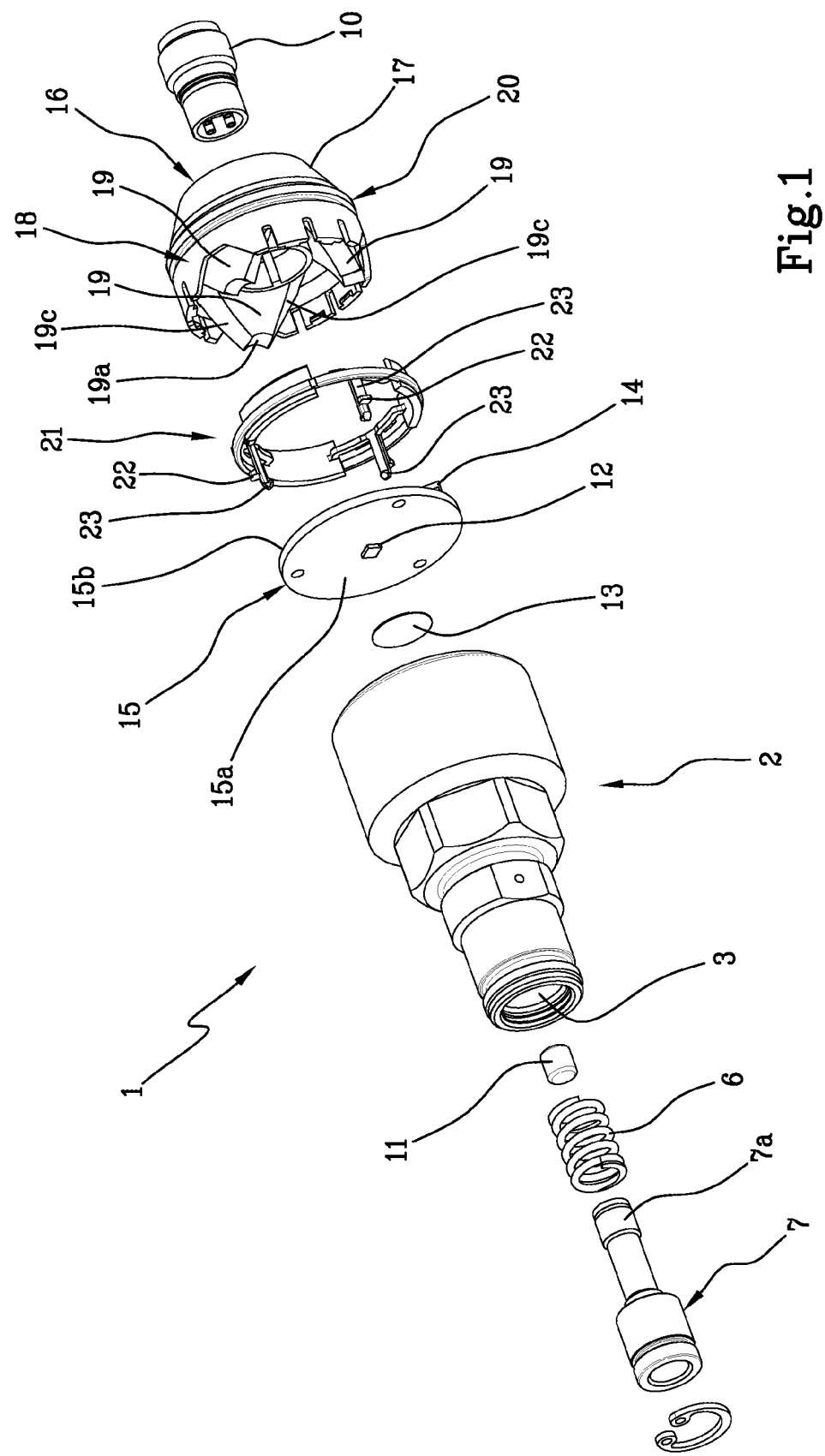
FIG. 1 shows an exploded figure of the differential pressure sensor according to the present invention.
Figure 2:
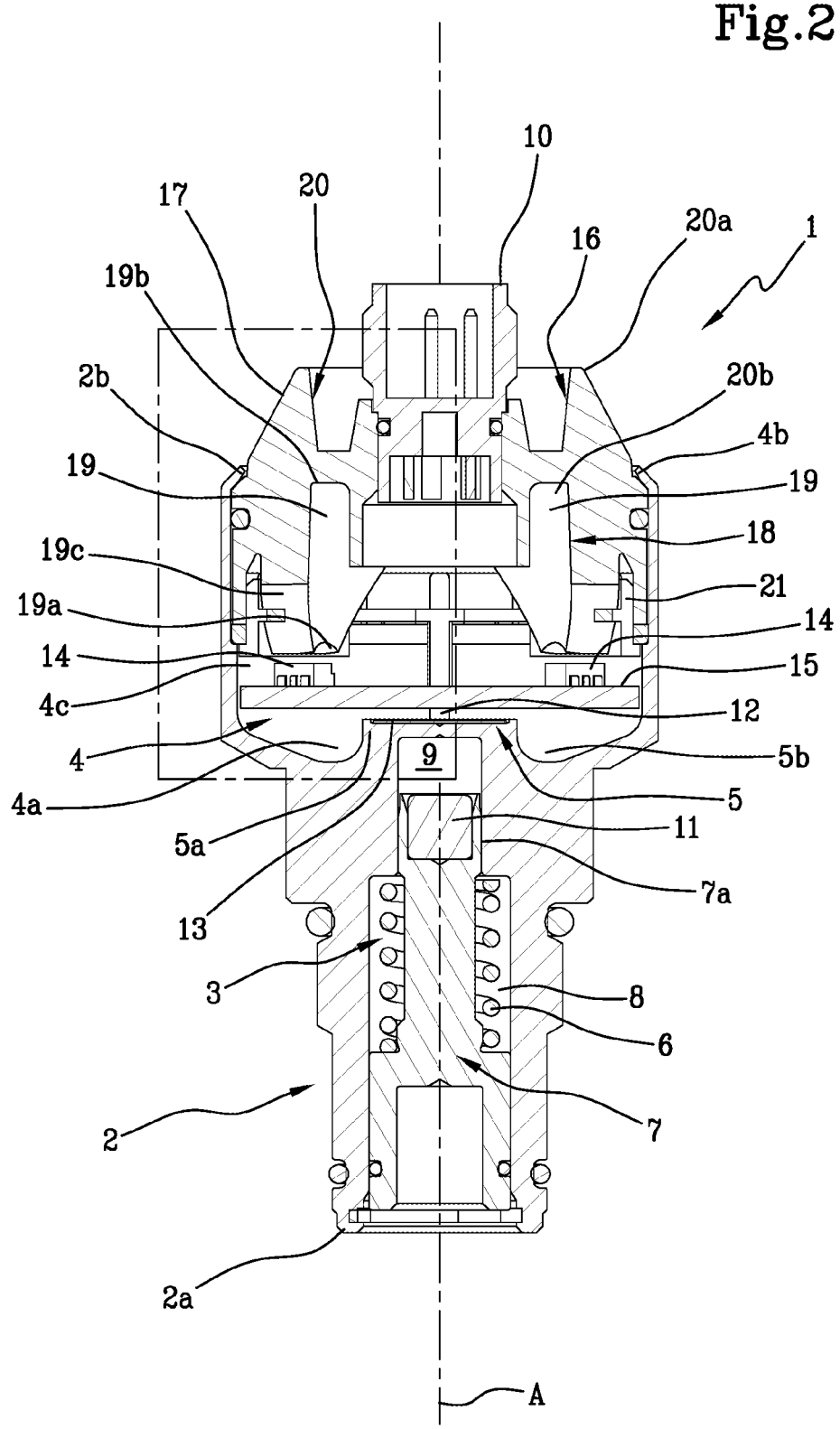
FIGS. 2 and 3 show two longitudinal sections, which are off-set between each other by 90°, of a differential pressure sensor according to the present invention.
Figure 3:
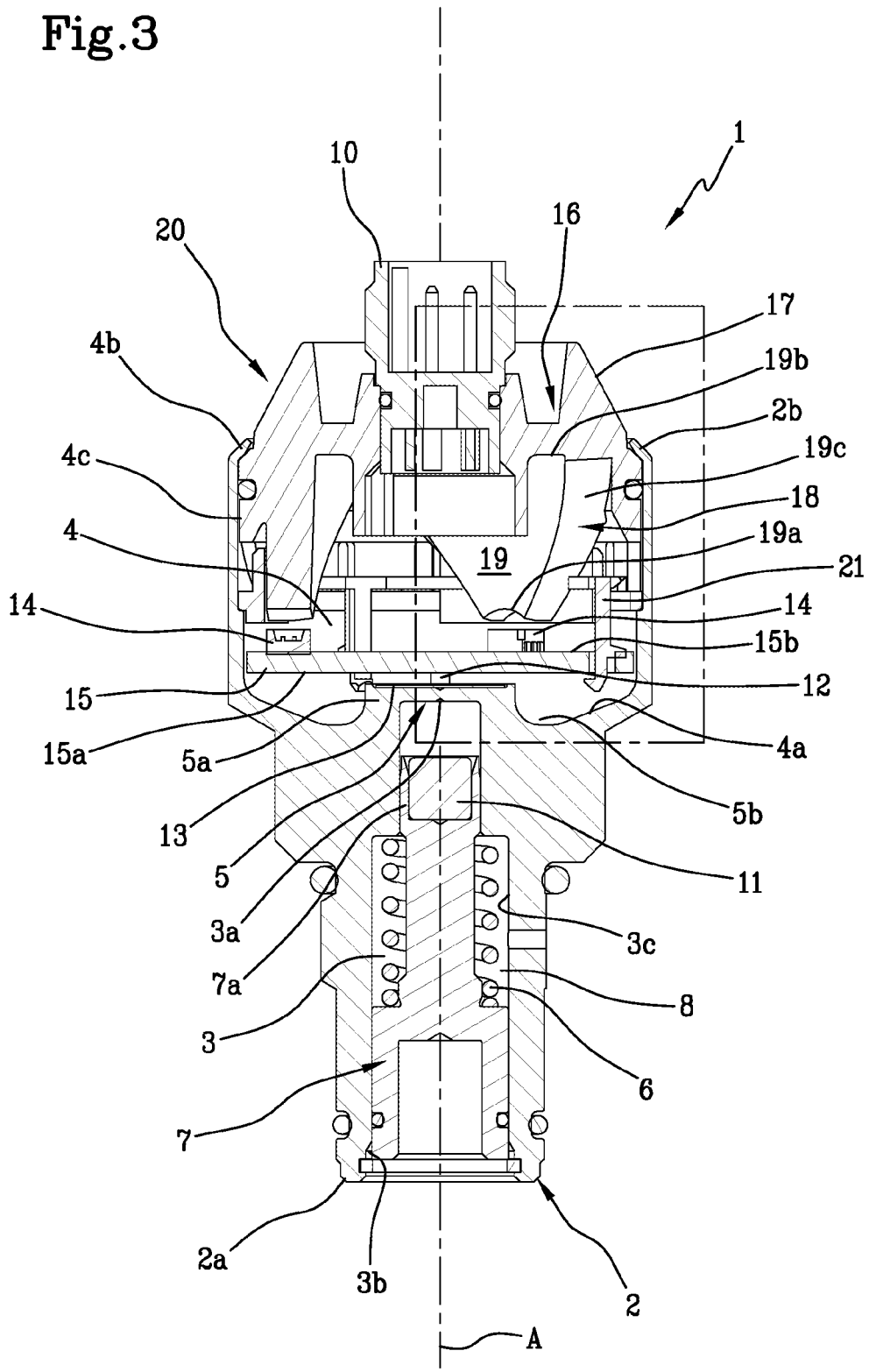
Figure 5:
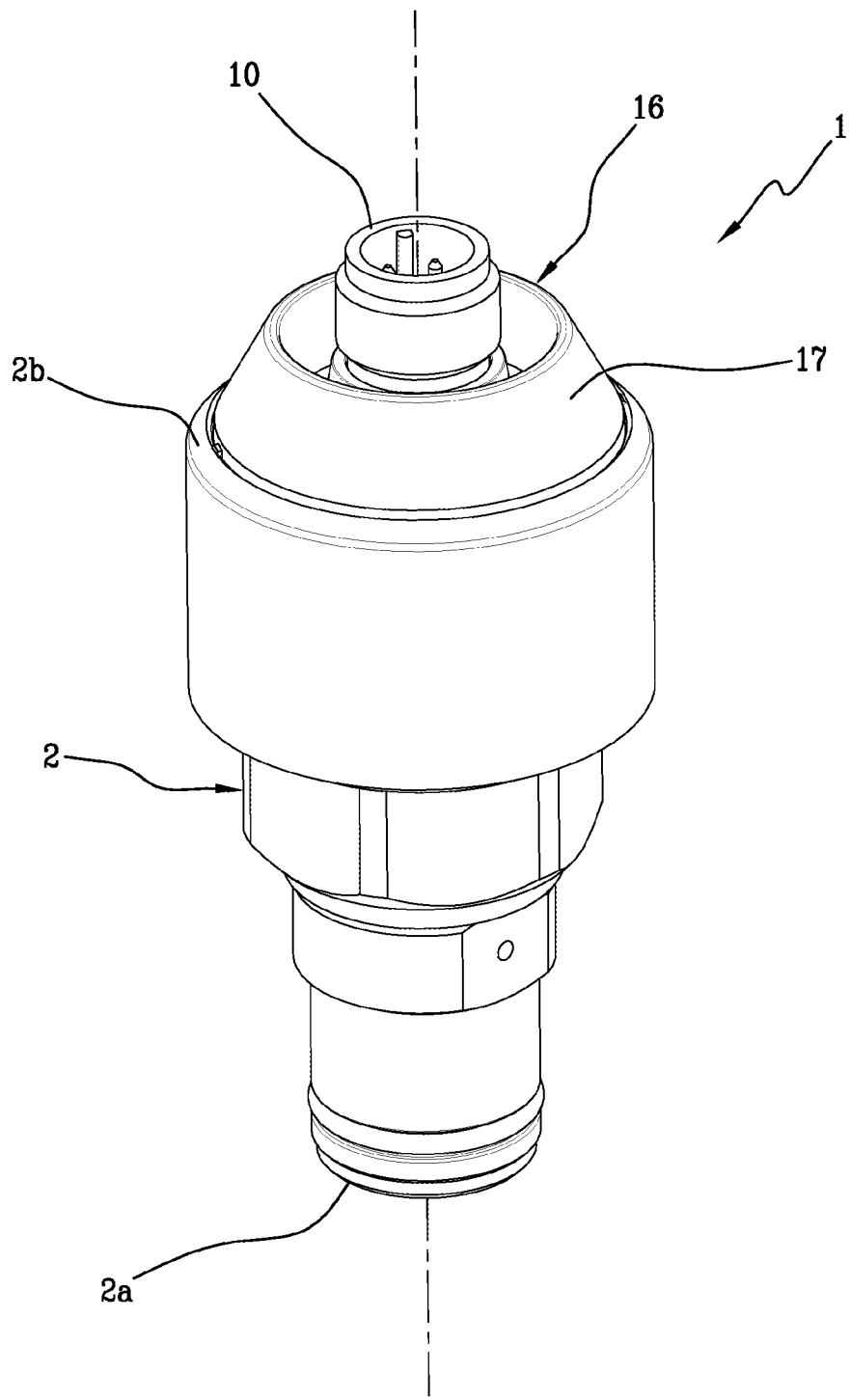
FIG. 5 shows a perspective view of the sensor illustrated in the preceding figures.

Thus, with reference to the appended figures, number 1 identifies a differential pressure sensor according to the present invention.

The differential pressure sensor 1 comprises a containment body 2 (typically rigid) extending along a main axis thereof "A" (or central) between a first end portion 2a and a second end portion 2b.

The main body 2 is shaped so as to define a first cavity 3 and a second cavity 4 separated from each other by a separation wall 5.

Such separation wall 5 extends transversely (preferably orthogonally) to the main axis "A".

The cavities 3, 4 are thus arranged in succession along the main axis "A".

Note that the first cavity 3 is positioned at the first end portion 2a of the containment body 2.

The second cavity 4 is positioned at the second end portion 2b of the containment body 2.

The separation wall 5 is arranged in an intermediate area of the containment body 2.

Thus, each cavity 3, 4 extends from a bottom wall 3a, 4a corresponding to the separation wall 5, to a free end 3b, 4b and has a side surface 3c, 4c.

Preferably, the first 3 and the second cavity 4 and the containment body 2 substantially have (except for some details, such as opportune chamfers, key surfaces, etc., as shown in the Figure) a cylindrical symmetry around the main axis "A". Thus, the side surfaces are preferably cylindrical.

Consequently, in the present application, all reference to the main axis "A" is understood as referring to the axis passing through an orthogonally central (or median) position of the sensor, as shown in the appended figures.

The pressure sensor 1 further comprises a piston 7 slidingly housed in the first cavity, so as to separate the latter (e.g. by means of an O-ring, with seal and/or with slight seepage of the fluid) into a first 8 and a second chamber 9.

Each chamber 8, 9 is placed in fluid communication (for example by means of hydraulic pipes, not shown) with the outside of the containment body 2.

In this way, the two chambers 8, 9 can be placed in fluid connection with, and therefore at the pressure of, the points of the hydraulic circuit to be checked (e.g. upstream and downstream of a filter).

Preferably, the piston 7 comprises a permanent magnet 11 mounted on an axial end thereof 7a, proximal to the separation wall 5.

Furthermore, the presence of retaining means (e.g. a spring 6) is comprised in the preferred embodiment, arranged inside the first cavity 3 and associated with the piston 7 to give it a predetermined axial preload.

The pressure sensor 1 further comprises a magnetic sensor 12 housed in the second cavity 4, near the separation wall 5.

Such magnetic sensor 12 is configured for measuring the axial distance of the magnet 11 from the separation wall 5 and for generating a signal representing such distance.

In the preferred embodiment, the magnetic sensor 12 is based on the Hall effect.

Therefore, the magnetic sensor 12 preferably touches (in other words, is in substantial contact) with the separation wall 5.

Note that the contact does not necessarily have to be direct, but in the present document, the expression "contact" is also understood to include the case (illustrated) in which there is an electrically insulating intermediate layer 13 between the magnetic sensor 12 and the wall 5.

Such intermediate layer 13 (which has a limited thickness, preferably lower than 0.2 mm) is preferably a Mylar sheet.

According to one aspect of the present invention, the pressure sensor 1 comprises at least one lighting element 14 capable of emitting light radiation and a control circuit 15 operatively interposed between the magnetic sensor 12 and the lighting element 14.

The power supply to the circuit 15 is preferably supplied by means of a connector 10 positioned at the second end 2b of the containment body 2.

Such control circuit 15 is configured for varying the light radiation emitted by the lighting element 14 as a function of a variation in the signal generated by said magnetic sensor 12.

Thus, the control circuit 15 (or printed circuit board) is a driver board of the lighting element 14, configured for sending it a control signal according to the signal received from the magnetic sensor 12.

Thus, structurally, the control circuit 15 has a substantially planar, more preferably discoidal shape. In fact, in the preferred embodiment, the control circuit 15 is a control board or a printed circuit board.

In other words, the circuit 15 has a first face 15a facing towards the separation wall 5 and a second face 15b, opposite the first, oriented away from the separation wall 5.

The magnetic sensor 12 is fixed to the first face 15a of the control circuit 15.

The lighting element 14 is fixed to the second face 15b of the control circuit 15, facing away from the separation wall 5.

Preferably, the pressure sensor 1 comprises a plurality of lighting elements 14.

In the preferred embodiment, such lighting elements are angularly spaced around said main axis "A", so as to supply light radiation, which is distributed circumferentially as much as possible and visible to operators from any position.

Therefore, with reference to the appended figures, each lighting element is anchored to the second face 15b of the control circuit 15 in a preferably peripheral position.

In the preferred embodiment, the lighting elements 14 are angularly evenly spaced, so as to diffuse the light radiation in a uniform manner.

Preferably, each lighting element 14 is a LED, more preferably an RGB LED.

The control circuit 15 is thus configured for varying the supply current of the LEDs according to the signal received from the magnetic sensor 12.

In particular, with reference to the preferred embodiment, the control circuit 15 is designed to compare the signal received from the magnetic sensor 12 with at least one reference, and pilot the lighting element 14 according to such comparison.

In detail, the control circuit 15 is programed with at least one threshold representing a predefined differential deviation in pressure.

In use, the circuit 15 regulates the lighting element 14 at a determined current (in other words, so as to emit a predetermined light radiation). When the signal received from the magnetic sensor 12 exceeds said threshold, the control circuit 15 varies the supply current of the lighting element 14, thus contributing to varying the shade of the light radiation.

The preferred embodiment includes more than one threshold, preferably at least three, more preferably four.

A light radiation shade is thus associated with each value.

In use, in the preferred embodiment, the control circuit 15:

regulates the lighting element, so as to make it emit green light radiation;

on exceeding a first threshold, it regulates the lighting element to emit yellow light radiation;

on exceeding a second threshold, it regulates the lighting element to emit red light radiation.

Optionally, an additional threshold is comprised between the first and the second, on the surpassing of which, the control circuit 15 regulates the lighting element to emit orange light radiation.

In a further embodiment option, a maximum safety threshold is comprised, on the surpassing of which the control circuit 15 regulates the lighting element to emit intermittent/pulsating radiation.

Therefore, with reference to the above, the lighting element (or the lighting elements) 14 is placed inside the second cavity 4 of the containment body 2 and, with reference to the main axis "A", in an intermediate position between the magnetic sensor 12 and the second end portion 2b.

More specifically, in order to keep the magnetic sensor 12 in contact (mechanical) with the separation wall 5, the control circuit 15 is placed in proximity to the same.

In this light, according to one aspect of the present invention, in order to allow the diffusion of the light radiation, the pressure sensor 1 thus comprises at least one interface element 16 provided with at least one radiant surface 17 facing outwards from the containment body 2, and an optical guide extending between the lighting element 14 (or the lighting elements) and the radiant surface 17, shaped to transfer the light radiation from the lighting element 14 to the radiant surface 17.

In fact, the radiant surface 17 is placed at the second end 2b of the containment body 2, thus in a position distanced from the separation wall 5.

In order to guarantee the diffusion of the light effect in a uniform manner, the radiant surface is preferably rough, more preferably obtained by means of embossing.

Note that the radiant surface 17 preferably has a greater extension than a light emitting surface of the lighting element 14.

The optical guide 18 is thus configured for diffusing the light radiation from the lighting element 14 to the radiant surface 17, allowing an increase in light portion of the pressure sensor 1, making the visualization of the light signal easy and immediate for operators.

In consideration of the fact that the lighting elements 14 are placed inside the second cavity 4, the optical guide 18 is defined by a transmission column 19 of the light radiation, extending along the main axis "A", between a first end 19a, facing the lighting element 14 and a second end, 19b, facing or integrated into said radiant surface 17.

Preferably, note that the radiant surface 17 extends annularly around said main axis "A".

Therefore, the interface element 16 has at least one annular portion anchored to the second end portion 2b of the containment body 2 and it is provided with a peripheral annular band defining the radiant surface 17.

Note that, preferably, such interface element 16 extends around the connector 10.

In order to transmit the light radiation from the plurality of lighting elements 14 to the radiant surface 17, the pressure sensor 1 thus comprises one or more transmission columns 19.

Each transmission column 19 (in other words, the optical guide 18) is therefore configured for diffusing the light radiation onto the radiant surface 17 in a uniform manner.

Therefore, the transmission column 19 has a flared shape, going from the first end 19a towards the second end 19b.

More specifically, each transmission column 19 also has a transversal development to the main axis "A", in other words, a circumferential development, between two lateral sides 19c.

At the second end 19b, each lateral side 19c of a column 19 is arranged in proximity to a corresponding lateral side 19c of the adjacent column 19.

Advantageously, in this way, the entire circumferential perimeter of the radiant surface is substantially covered by the second ends 19b of the transmission columns 19, allowing a correct and complete diffusion of the light variation.

In order to receive and capture the light beams emitted by the lighting element better (generally diffused radially), the first end 19a of each transmission column 19 has a concave shape facing towards the lighting element 14.

In this way, the light beams hit the surface of the optical guide 18 orthogonally, or almost, and are guided towards the radiant surface 17 better.

Preferably, the optical guide 18 and the radiant surface 17 are made in one piece.

Therefore, the pressure sensor 1 comprises a cap 20 anchored to the second end of the containment body 2, comprising both the interface element 16 and the optical guide 18.

Thus, in the preferred embodiment, the cap 20 comprises an annular top portion 20a defining the interface element 16 (and the radiant surface 17) provided with at least one axial protrusion 20b defining the optical guide 18.

Preferably, according to the embodiment described thus far, the cap 20 comprises a plurality of axial protrusions 20b, each defining a transmission column 19.

According to a further aspect of the present invention, in order to facilitate the assembly of the pressure sensor 1 guaranteeing the precision needed to guarantee the operating accuracy thereof, a centering member 21 is comprised, which is connectable to both the control circuit 15 and the optical guide 18, so as to allow a precise pre-assembly of the same prior to their insertion into the second cavity 2.

This is particularly advantageous with reference to the illustrated embodiment, wherein the magnetic sensor 12 and the lighting element or elements 14 are axially constrained to the circuit 15 and/or the optical guide 18 is integrated into the interface element 16.

In fact, the presence of all of the elements requires a precise positioning of the same both axially and radially.

Advantageously, in such embodiment there are only two elements to be assembled (circuit 15 and interface element 16), connectable simply by means of the only centering member 21.

Such centering member 21 is provided with a portion 21a proximal to the separation wall 5 and a portion 21b distal to the separation wall 5.

The proximal portion 21a is connected to the control circuit 15, while the distal portion 21b is connected to the optical guide 18.

Preferably, in order to guarantee the correct positioning between the optical guide 18 (or the column 19) and the respective lighting element 14, the centering member 21 comprises a phasing unit 28, operatively interposed between the centering member 21, the optical guide 18 and the circuit 15 and configured for determining the reciprocal angular orientation thereof.

In other words, the phasing unit 28 guarantees the correct and precise orientation of the circuit 15 with respect to the optical guide 18, allowing each lighting element 14 to be facing and axially aligned with the respective column 19.

In the preferred embodiment, the phasing unit 28 comprises at least one tooth coupled to the optical guide 18. Such tooth is constrained to the rotation with said optical guide 18.

With reference to the proximal portion 21a of the centering member 21, this is slidingly constrained to the control circuit 15 to guarantee the radial positioning thereof and allow an axial movement thereof.

The distal portion 21b is axially constrained to the optical guide 18.

More specifically, the proximal portion 21a of the centering member 21 has at least one abutment shoulder 22 (or stroke end) arranged in a position distal to the separation wall 5 with respect to the control circuit 15.

The abutment shoulder 22 is configured for limiting the axial sliding of the circuit by keeping the magnetic sensor 12 pressed (constrained to the first face of the circuit 15) on the separation wall 5.

In order to keep the control circuit 15 (and especially the magnetic sensor 12) radially centered, such proximal portion 21a comprises a plurality of axial arms 23 angularly spaced with respect to one another around said main axis "A". Each arm 23 is slidingly inserted through the control circuit 15 and it is provided with the abutment shoulder 22.

Note that the arms 23 univocally define the angular position in which the circuit 15 can be coupled to the centering member 21; therefore, such arms 23, in conjunction with the tooth described above, define the phasing unit.

The separation wall 5 has a raised central portion 5a, on which the magnetic sensor 12 comes into contact, surrounded by ribbing 5b or an annular cavity, in which the free ends 23a of the arms 23 (which have a "deeper" axial position than the control circuit 15) are inserted.

Note that, preferably, each arm 23 has a sliding edge, which is inclined with respect to the central axis "A" and preferably tapered in the direction of the separation wall 5.

Advantageously, in this way, the edges of the arms 23 define wedges, which act radially in a uniform manner, favoring the centering of the circuit. In other words, the connection between arms 23 and circuit 15 is self-centering.

Note that a stop element 24 is included, at the free end 23a of each arm 23 (proximal to the separation wall 5) configured for preventing the axial detachment of the control circuit 15, facilitating pre-assembly.

In the preferred embodiment, the stop element 24 is defined by a catch/hook facing towards the central axis "A".

Instead, with reference to the distal portion 21b of the centering member 21, it comprises at least one support element 25 on a corresponding support shoulder 26 obtained in the side wall 4c of the second cavity 4.

Advantageously, in this way, it is possible to position the entire circuit/centering member/optical guide assembly simply by pressing it inside the cavity until it reaches the support shoulder 26.

By correctly modulating the length of the arms 23 and/or the positioning of the abutment shoulders 22 with the positioning of the support element 25, it is thus possible to guarantee the correct positioning of the magnetic sensor 12 without complicating the assembly of the device.

In fact, after assembly of the pressure sensor, the axial distance between the support element 25 (or the support shoulder 26) and the central portion 5a of the separation wall 5 is preferably lower than the sum of the axial distance between the support element 25 the abutment shoulder 22 with the thickness of the control circuit 15, guaranteeing that "preload" needed to press the magnetic sensor 12 on the separation wall 5.

In this regard, note that the proximal portion 21a and the distal portion 21b are connected to each other by means of an elastic joint 21c, or an axially flexible portion, which allows the abutment shoulders 22 to be kept pressed on the control circuit 15 (and consequently the sensor 12 on the separation wall 5).

In the same way, the axial distance between the support element 25 and the free end 23a of the arms 23 is greater than the distance between the support shoulder 26 and the central portion 5a of the separation wall 5.

In order to guarantee the correct axial positioning of the optical guide 18 with respect to the lighting elements 14, necessary for allowing the correct diffusion of the light radiation, the distal portion 21b of the centering member 21 further comprises a retaining element 27, axially constrained to the optical guide 18.

The invention achieves the intended objects and brings important advantages.

In fact, the presence of an optical guide capable of diffusing precise light radiation emitted by a single lighting element over the entire radiant surface makes the light signal easily visible to operators, also from a distance.

Furthermore, the presence of an optical guide integrated into the radiant surface facilitates the assembly of the device, keeping the transduction particularly accurate.

The invention claimed is:

1. A differential pressure sensor comprising:
   a containment body extending along a main axis thereof and including internally a separation wall suitable for dividing said containment body into a first cavity and a second cavity arranged in succession along said main axis;
   a piston slidingly housed in the first cavity, so as to separate the first cavity into a first chamber and a second chamber, wherein each of the first and second chambers is in fluid communication with an exterior of the containment body; said piston comprising a magnet mounted on a first axial end thereof, proximal to the separation wall;
   a magnetic sensor housed in the second cavity, near the separation wall and configured for measuring an axial distance of the magnet from said separation wall and for generating a signal representing the measured axial distance;
   a plurality of lighting elements capable of emitting light radiation and angularly spaced around said main axis to supply a light radiation which is distributed circumferentially;
   a control circuit operatively interposed between said magnetic sensor and said lighting elements and configured for varying the light radiation emitted by the lighting elements as a function of a variation in the representative signal generated by said magnetic sensor, so that an output signal of the magnetic sensor translates into a chromatic variation of the lighting elements;
   an interface element including a radiant surface facing outwards from the containment body and extending annularly around said main axis;
   an optical guide extending between each of said lighting elements and said radiant surface and comprising at least one transmission column shaped for transferring the light radiation of the lighting elements to the radiant surface.

2. The differential pressure sensor according to claim 1, wherein said radiant surface has a greater extension than light emitting surfaces of the lighting elements, wherein said optical guide is configured for guiding and diffusing the light radiation of the lighting elements to the radiant surface.

3. The differential pressure sensor according to claim 1, wherein said optical guide and said radiant surface are a single piece of material.

4. The differential pressure sensor according to claim 1, wherein said lighting elements are arranged inside the second cavity of the containment body and, with reference to the main axis, in an intermediate position between said magnetic sensor and said interface element; said at least one transmission column extending along said main axis between a first end, facing towards said lighting elements, and a second end, facing towards or integrated into said radiant surface.

5. The differential pressure sensor according to claim 4, wherein said first end of the at least one transmission column has a concave shape facing towards the lighting elements in order to receive the light radiation emitted by the lighting elements orthogonally.

6. The differential pressure sensor according to claim 1, wherein the at least one transmission column includes a plurality of the transmission columns of the light radiation, extending between a first end, facing towards a respective lighting element, and a second end, connected to the interface element.

7. The differential pressure sensor according to claim 6, wherein each of the transmission columns extends transversely with respect to the main axis between two lateral sides, wherein, at the second end, lateral sides of the transmission columns are arranged in proximity to corresponding lateral sides of adjacent transmission columns, so as to diffuse the light radiation in a substantially uniform manner over the entire radiant surface.

8. The differential pressure sensor according to claim 1, wherein said control circuit has a first face facing towards the separation wall and a second face, opposite the first, and facing away from the separation wall; said lighting elements being fixed to the second face of the control circuit and said magnetic sensor being fixed to the first face of the control circuit.

9. The differential pressure sensor according to claim 1, and further comprising a centering member including a proximal portion proximal to the separation wall connected to the control circuit, and a distal portion distal to the separation wall connected to the optical guide; said centering member comprising a phasing unit operatively interposed between the centering member, the optical guide and the control circuit and configured for setting a reciprocal angular orientation thereof.

10. The differential pressure sensor according to claim 9, wherein said proximal portion comprises a plurality of axial arms, angularly spaced with respect to one another around said main axis, each one slidingly inserted through the control circuit and including an abutment shoulder, or stroke end, arranged in a position distal to the separation wall with respect to the control circuit and configured for limiting an axial sliding thereof by keeping the magnetic sensor pressed on the separation wall.

11. The differential pressure sensor according to claim 9, wherein the distal portion of the centering member comprises:
   at least one support element, arranged on a corresponding support shoulder, obtained in a side wall of the second cavity and
   at least one retaining element, axially connected to said optical guide, to hold the optical guide in a defined axial position.

12. The differential pressure sensor according to claim 9, wherein the distal portion of the centering member comprises:
   at least one support element, arranged on a corresponding support shoulder, obtained in a side wall of the second cavity and
   at least one retaining element, axially connected to said optical guide, to hold the optical guide in a defined axial position.

13. The differential pressure sensor according claim 1, comprising a connector positioned at an end of the containment body and configured to supply power to the circuit; said interface element extending around the connector.

14. The differential pressure sensor according to claim 1, wherein said lighting elements comprise one or more LEDs.

15. The differential pressure sensor according to claim 14, wherein said one or more LEDs include RGB LEDs controllable by the control circuit in colors green-yellow-orange-red.

16. A differential pressure sensor comprising:
   a containment body extending along a main axis thereof and including internally a separation wall suitable for dividing said containment body into a first cavity and a second cavity arranged in succession along said main axis;
   a piston slidingly housed in the first cavity, so as to separate the first cavity into a first chamber and a second chamber, wherein each of the first and second chambers is in fluid communication with an exterior of the containment body; said piston comprising a magnet mounted on a first axial end thereof, proximal to the separation wall;
   a magnetic sensor housed in the second cavity, near the separation wall and configured for measuring an axial distance of the magnet from said separation wall and for generating a signal representing the measured axial distance;
   a lighting element capable of emitting light radiation;
   a control circuit operatively interposed between said magnetic sensor and said lighting element and configured for varying the light radiation emitted by the lighting element as a function of a variation in the representative signal generated by said magnetic sensor, so that an output signal of the magnetic sensor translates into a chromatic variation of the lighting element;
   an interface element including a radiant surface facing outwards from the containment body and extending annularly around said main axis;
   an optical guide extending between said lighting element and said radiant surface and comprising at least one transmission column shaped for transferring the light radiation of the lighting element to the radiant surface;
   a centering member including a proximal portion proximal to the separation wall connected to the control circuit, and a distal portion distal to the separation wall connected to the optical guide; said centering member comprising a phasing unit operatively interposed between the centering member, the optical guide and the control circuit and configured for setting a reciprocal angular orientation thereof.

17. The differential pressure sensor according to claim 16, wherein said proximal portion comprises a plurality of axial arms, angularly spaced with respect to one another around said main axis, each one slidingly inserted through the control circuit and including an abutment shoulder, or stroke end, arranged in a position distal to the separation wall with respect to the control circuit and configured for limiting an axial sliding thereof by keeping the magnetic sensor pressed on the separation wall.

* * * * *